United States Patent
Ren (10) Patent No.: US 9,501,462 B2
(45) Date of Patent: Nov. 22, 2016

(54) FORM OBJECT HAVING FORM REPRESENTATION AND GRID REPRESENTATION OF FORM

(71) Applicant: G360Link, Inc., Acton, MA (US)

(72) Inventor: Biao Ren, Acton, MA (US)

(73) Assignee: G360Link, Inc., Acton, MA (US)

( * ) Notice: Subject to any disclaimer, the term of this patent is extended or adjusted under 35 U.S.C. 154(b) by 219 days.

(21) Appl. No.: 14/093,955

(22) Filed: Dec. 2, 2013

(65) Prior Publication Data

US 2015/0154170 A1    Jun. 4, 2015

(51) Int. Cl.
*G06F 17/22*      (2006.01)
*G06F 17/24*      (2006.01)
*G06F 3/0481*     (2013.01)

(52) U.S. Cl.
CPC ........... *G06F 17/243* (2013.01); *G06F 3/0481* (2013.01); *G06F 3/04815* (2013.01); *G06F 17/246* (2013.01)

(58) Field of Classification Search
CPC ............. G06F 17/243; G06F 3/0481; G06F 3/04815; G06F 17/246
USPC ........................................ 715/219
See application file for complete search history.

(56) References Cited

U.S. PATENT DOCUMENTS

| | | | | |
|---|---|---|---|---|
| 8,001,465 B2 * | 8/2011 | Kudrolli | | G06F 17/246 715/200 |
| 8,316,318 B2 * | 11/2012 | Shortell | | G06F 17/246 715/212 |
| 8,788,928 B2 * | 7/2014 | McColl | | G06F 17/246 715/219 |
| 2003/0028560 A1 * | 2/2003 | Kudrolli | | G06F 17/246 715/273 |
| 2006/0031747 A1 * | 2/2006 | Wada | | G06F 17/212 715/221 |
| 2007/0050701 A1 * | 3/2007 | El Emam | | G06F 17/243 715/201 |
| 2008/0244430 A1 * | 10/2008 | Shortell | | G06F 17/246 715/764 |
| 2009/0132904 A1 * | 5/2009 | Holloway | | G06Q 10/10 715/224 |
| 2009/0210814 A1 | 8/2009 | Agrusa et al. | | |
| 2011/0016379 A1 * | 1/2011 | McColl | | G06F 17/246 715/219 |
| 2011/0050686 A1 * | 3/2011 | Nojima | | G06F 3/04815 345/419 |
| 2011/0154017 A1 * | 6/2011 | Edstrom | | H04L 63/0823 713/151 |
| 2012/0144284 A1 * | 6/2012 | Le Brazidec | | G06F 17/246 715/219 |

(Continued)

OTHER PUBLICATIONS

Ted Padova and Angie Okamoto, PDF Forms Using Acrobat and LiveCycle Designer Bible, 2009, Wiley Publishing, p. xxxvi, 83, 89, 97, 111, 208, 219, 220, 231, 256, 494, 690, 745, 929, 930, 934, 938, 971, 973, 993, 995.*

(Continued)

*Primary Examiner* — Maikhanh Nguyen
(74) *Attorney, Agent, or Firm* — BainwoodHuang (57) ABSTRACT

A form representation of a form is created including an arrangement of form elements with possible data selections from which a form user will make actual selections. A grid representation is automatically created based on the form representation, including an array of cells corresponding to the form elements and the selections and being organized in a first dimension per the arrangement of the form elements and in a second dimension per the possible data selections. Subsequently, (i) properties are identified and property values are assigned to array cells, the property values being user-visible in respective cells in a properties view, and (ii) functions are created for performing calculations using the actual data selections and the property values to yield derived values during use of the form. Events may also be triggered that are defined in the form object.

20 Claims, 8 Drawing Sheets

(56) References Cited

U.S. PATENT DOCUMENTS

2012/0173476 A1* 7/2012 Rizvi ................ G06F 17/30539
707/601
2013/0024826 A1 1/2013 Master

OTHER PUBLICATIONS

Ted Padova and Angie Okamoto, PDF Forms Using Acrobat and LiveCycle Designer Bible, 2009, Wiley Publishing, p. xxxvi, 83, 89, 97, 111, 162-164, 166, 168, 208, 219, 220, 231, 249, 256, 268, 271, 494, 690, 745, 929, 930, 934, 938, 971, 973, 993, 995.*

* cited by examiner

| | A | | B | C | D | |
|---|---|---|---|---|---|---|
| | | | | Refresh | Save | Back |
| 1 | Section 1 | | | | | |
| 2 | Line 1 | Yes | | No | Not Applicable | |
| 3 | Line 2 | Yes | | No | Not Applicable | |
| 4 | Section 2 | | | | | |
| 5 | Line 3 | Yes | | No | Not Applicable | |
| 6 | Section 3 | | | | | |
| 7 | Line 4 | Yes | | No | Not Applicable | |
| 8 | | | | | | |
| 9 | | | | | | |
| 10 | | | | | | |
| 11 | | | | | | |
| 12 | | | | | | |
| 13 | | | | | | |
| 14 | | | | | | |

| | A1 | | | criticality | | B | | C | | D | |
|---|---|---|---|---|---|---|---|---|---|---|---|
| | | | | | | | | Refresh | | Save | Back |
| 1 | Section 1 | | | 30 | | | | | | | |
| 2 | Line 1 | | | | Yes | | No | | | Not Applicable | |
| 3 | Line 2 | | | | Yes | | No | | | Not Applicable | |
| 4 | Section 2 | | | 40 | | | | | | | |
| 5 | Line 3 | | | | Yes | | No | | | Not Applicable | |
| 6 | Section 3 | | | 30 | | | | | | | |
| 7 | Line 4 | | | | Yes | | No | | | Not Applicable | |
| 8 | | | | | | | | | | | |
| 9 | | | | | | | | | | | |
| 10 | | | | | | | | | | | |
| 11 | | | | | | | | | | | |
| 12 | | | | | | | | | | | |
| 13 | | | | | | | | | | | |
| 14 | | | | | | | | | | | |

| | A | B | | C | D | |
|---|---|---|---|---|---|---|
| | | | | Refresh | Save | Back |
| 1 | Section 1 | | | | | |
| 2 | Line 1 | Yes | 20 | No | -20 | Not Applicable | 0 |
| 3 | Line 2 | Yes | 10 | No | -10 | Not Applicable | 0 |
| 4 | Section 2 | | | | | |
| 5 | Line 3 | Yes | 5 | No | -5 | Not Applicable | 0 |
| 6 | Section 3 | | | | | |
| 7 | Line 4 | Yes | 10 | No | -10 | Not Applicable | 0 |
| 8 | | | | | | |
| 9 | | | | | | |
| 10 | | | | | | |
| 11 | | | | | | |
| 12 | | | | | | |
| 13 | | | | | | |
| 14 | | | | | | |

FORM OBJECT HAVING FORM REPRESENTATION AND GRID REPRESENTATION OF FORM

BACKGROUND

The invention is related to the field of data collection and analysis.

A variety of software programs (tools) are known for collecting data and providing aspects of analysis to collected data.

Enterprise resource planning (ERP) systems are generally large-scale systems that provide interfaces for consuming input data as well as interfaces for performing analytical processes and/or reporting on collected data. A typical ERP system is deployed in an organization and becomes tailored for the types of data and analysis needed by the organization. When suitably matched to its organizational environment, an ERP system can provide very powerful data processing.

It is also known to use smaller-scale tools, such as spreadsheet applications, for data collection and analysis. Smaller-scale tools are good candidates in a variety of environments, for example in collaborative environments where a larger-scale system focused on the needs of one organization may not be suitable for capturing the needs of the collaboration. Smaller-scale tools also capture data that is more fluidly defined—spreadsheets can be revised fairly easily to add columns or sheets and incorporate additional data.

SUMMARY

While existing data collection and analysis tools have certain strengths, they also have limitations or drawbacks that may be problematic for some uses. ERP systems, for example, can be very powerful and efficient especially for large-scale data collection and analysis, but they require tuning and a certain regularization of the input data—they are generally not sufficiently flexible for use with more informal or ad-hoc data collections. Spreadsheets address those needs, being easily tailorable, but in some applications this very strength can become a weakness. For example, in applications requiring the use of many instances of a spreadsheet (such as across a large set of suppliers or vendors), different instances may be modified in some undisciplined manner that negatively affects the quality of the data and/or analysis based on it. This could be as simple as renaming a field in one instance to make it easier for one user to enter data, at the expense of losing the consistency of a uniformly named field. Of course bigger problems can also be created.

It would be desirable to achieve a data collection and analysis tool that achieves both flexibility and ease of deployment in a variety of applications, with provision for greater centralized control as necessary to maintain consistency and integrity of data and analysis even when a large number of diverse parties may be involved.

Techniques are disclosed for capturing and analyzing data that include design, creation and use of custom form objects. In one aspect, a method is disclosed for creating a form object usable by a form user to capture and analyze data. In a first design operation, a tool responds to input from a form designer to create a form representation of a form and save the form representation as part of the form object, the form representation being displayable to a form user and including an arrangement of form elements selected by the designer and having sets of possible data selections from which the form user will select to create actual data selections. Subsequently, a grid representation of the form is automatically created based on the form representation and the grid representation is saved as part of the form object. The grid representation includes an array of cells corresponding to the form elements and sets of possible data selections. The array of cells is organized in a first dimension according to the arrangement of the form elements and in a second dimension according to the possible data selections in the sets of possible data selections. In a second design operation, the tool responds to input from the form designer to (i) identify properties and assign respective property values to selected cells of the array, the property values being user-visible with the respective cells in a properties view of the grid representation, and (ii) create functions for performing calculations using actual data selections and corresponding property values to yield derived values. The property values and functions are saved in the form object so as to automatically generate the derived values at a later time when the actual selections are provided by the form user.

One key feature of the disclosed technique is the multi-dimensional aspect that can be realized using the properties, each of which defines a corresponding array of additional property data layered with the selection data provided during form use. This provides great flexibility and power. Because the properties are under control of the form designer, however, there can be greater control over any revisions. A form can be protected in a way that only permits data to be entered. If the form structure is to be modified, such as by modifying or adding properties or changing the calculations performed by formulas embedded in the form, it is necessary to go through the design operations. Thus, changes cannot be made casually. Thus, the disclosed technique provides power and flexibility along with a level of designer control to promote consistency and integrity in a variety of applications.

In one embodiment, after the form being created in the designer, it is saved to an encrypted format and can be imported, exported, or transported via email or other means as a regular file. The saved form file contains meta data such as timestamps of creation time, modification, users info, and revision info. Such an interchange format separates the form object creation from the form object use and facilitates the management of the form objects.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
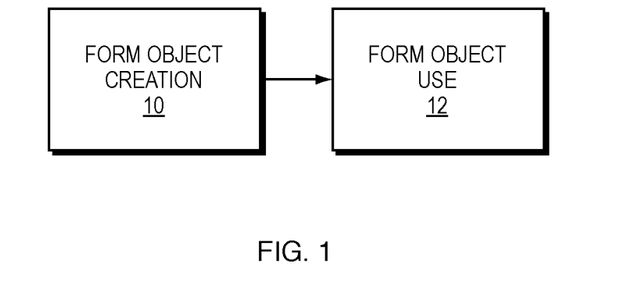
FIG. 1 is a high level flow diagram of a method of data collection and analysis using form objects.

FIG. 1 illustrates a method of data collection and analysis using form objects at a high level. At 10, a form object is created, and at 12 the form object is used for its intended purpose. Generally, the form object is a complex data object including graphical elements, data elements, and executable code. Specific attributes and examples are described below. During creation 10, a form designer identifies data to be collected and information for analyzing the data, including property values and functions. During use 12, a form user enters data into the form object, and the form object both stores the data and applies the properties and functions to the entered data. Once the form object is created, there may be one or multiple instances of the form object used in the use step 12. In one example application discussed below, the form object may be used to audit a number of vendors for compliance with certain contractual or industry standards, and in this application one instance of the form object may be used for each such vendor.

The approach of FIG. 1 provides for collection and analysis of data in ways that are both flexible and powerful. Because of the custom nature of the form object, the exact content and organization of the data can be user-defined, and it can also be changed as needs evolve. At the same time, by separating form creation and use, the scheme supports a variety of applications and goals including revision enforcement, ensuring integrity in the data capture and analysis processes. Again, specific examples are discussed below.

Figure 2:
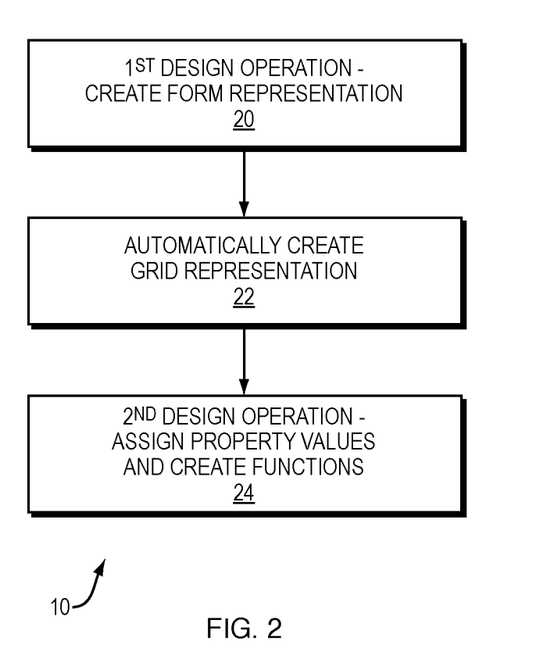
FIG. 2 is a flow diagram of form object creation.

FIG. 2 is a high-level flow diagram for the form object creation process 10 of FIG. 1. At 20 is a first design operation in which a "form representation" part of the form object is created. This is done by a design program or tool under control of a human form designer. The form representation includes user-specified controls, input objects and fields, etc. according to a user-specified layout, similar to online web forms. Examples are described below. At 22, the form representation is used to automatically create a "grid representation" part of the form object. The grid representation presents all user input selection options (as defined by the form controls etc. from the form representation) in an array form, having a grid layout that follows the organization of the form representation. At 24, the form designer engages in a second design operation using the grid representation, specifically to assign property values to selection options and to specify functions to be calculated based on actual user data selections (made later during use 12) and the property values. The function results are a form of derived data and may take a variety of forms and be used for a variety of purposes based on application. For example, one powerful type of function is a scoring calculation that assigns a numerical score based on data provided as input to the form and the property values assigned during design. Other examples are mentioned below.

As mentioned, the disclosed techniques may be embodied in part by a software program or tool. Aspects of such a program or tool are now described with reference to example screens of a graphical user interface (GUI) of the program or tool. Both the layout and use of these screens reflect the structure and function of the underlying software program.

Figure 3:
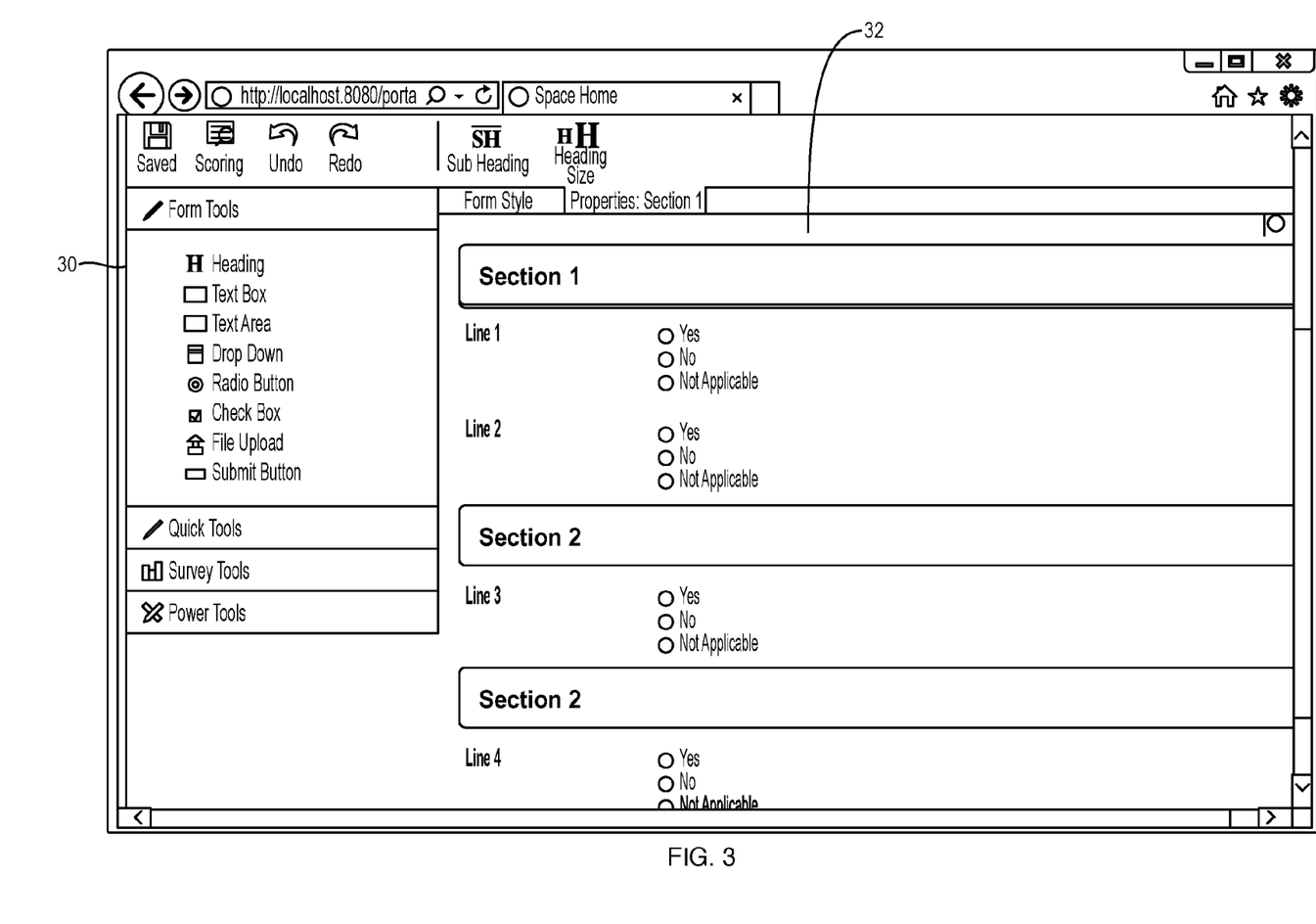
FIGS. 3 through 8 are example user interface screens for a form design process.

FIG. 3 shows a screen used in the first design operation 20 in which the form representation of the form object is created. The screen is divided into two main areas, a form element selection pane 30 at left and a form view pane 32 at right. The selection pane 30 contains predefined form elements that can be used in designing the form, such as "Heading", "Text Box", "Text Area", and so on. These can be dragged and dropped from the selection pane 30 to the form view pane 32 during creation of a form. As shown, the elements may be organized into different classes or groups, such as Quick Tools, Survey Tools, Power Tools (tools for administrative/power users), etc. The form view pane 32 presents the appearance of the form as it is designed. In the illustrated example a designer has created three vertically separated sections (1, 2 and 3), and has added certain radio-button controls in each section. At the bottom is a "Submit" button. In this simplified example, Section 1 might include a question at the position of the text "Line 1" that can be answered either Yes, No, or Not Applicable by selection of the corresponding radio button. Similar questions might appear at Line 2 of Section 1 as well as at Line 3 and Line 4 of Sections 2 and 3 respectively.

The form data will contain two parts:
Form elements (such as controls, etc.), and
Collected data (actual user input/selections received during later use of the form)

In the example of FIG. 3, a form element is a "Radio Button" which reads like:
Line 1
Yes
No
Not Applicable and the "collected data" refers to an actual selection (Yes or No or Not Applicable) made by a user at a future time. The user can be the same user (designer) who created the form, or a different user, and is referred to as the "form user."

The order of form elements within the layout of the form is captured as part of the meta data of the form. This is important information for additional logic and calculation to be performed on both the form element and collected data (described below).

Figure 4:
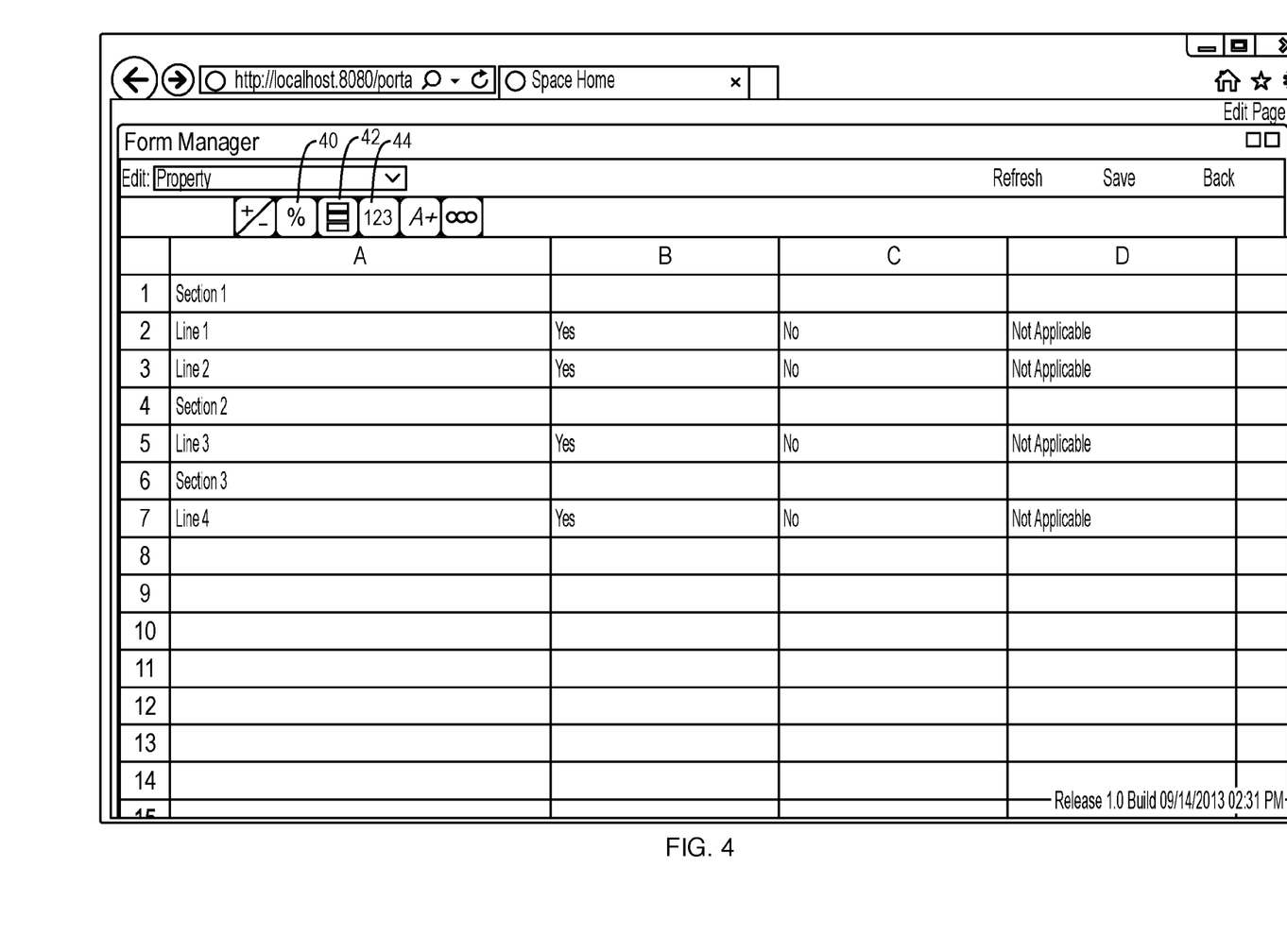

FIG. 4 illustrates the grid representation that is automatically created by the tool at 22 based on the form view created by the form designer (e.g., FIG. 3). The two-dimensional grid contains multiple lines with each line corresponding to a physical line in the form view. Each line has variable length with one or multiple cells, the cells representing corresponding parts of a form element.

For example, "Line 1" of the form which looks like the following in the form view:
Line 1:
Yes
No
Not Applicable is transformed into a row of five (5) cells in the grid view:
Cell 1: "2" (the row number)
Cell 2: "Line 1"
Cell 3: "Yes"
Cell 4: "No"
Cell 5: "Not Applicable"

Similarly, the line for "Section 2" is transformed to contain two (2) cells:
Cell 1: "4" (row number)
Cell 2: "Section 2"

As described above, this 2-D grid contains lines of generally non-uniform cells of different length. Each cell is addressable in the 2-D grid by its X-Y coordinates (like a Cartesian coordinate system). For example, the text "Line 1" is at address/location "A2", and the "Yes" selection for the radio button is at "B2", and so on.

Once the grid view is created as illustrated in FIG. 4, the form designer adds properties and functions to give the form desired functionality depending on the application. Properties are defined for use in the form, and specific property values are assigned to the cells. Each property can be viewed as an additional dimension of data in the grid. Thus, the technique readily captures multi-dimensional data and analysis in a compact and easily usable manner.

In general, any number of additional dimensions of data can be added to the 2-D grid. Properties may be predefined and packaged with the software program, and/or the software program may enable custom properties to be created and used in a designer-specified way. In the illustrated embodiment, predefined properties "weight", "criticality" and "value" are defined. These are represented by corresponding selection buttons 40, 42, 44 on a property toolbar as shown, and examples of their use are now described.

Figure 5:
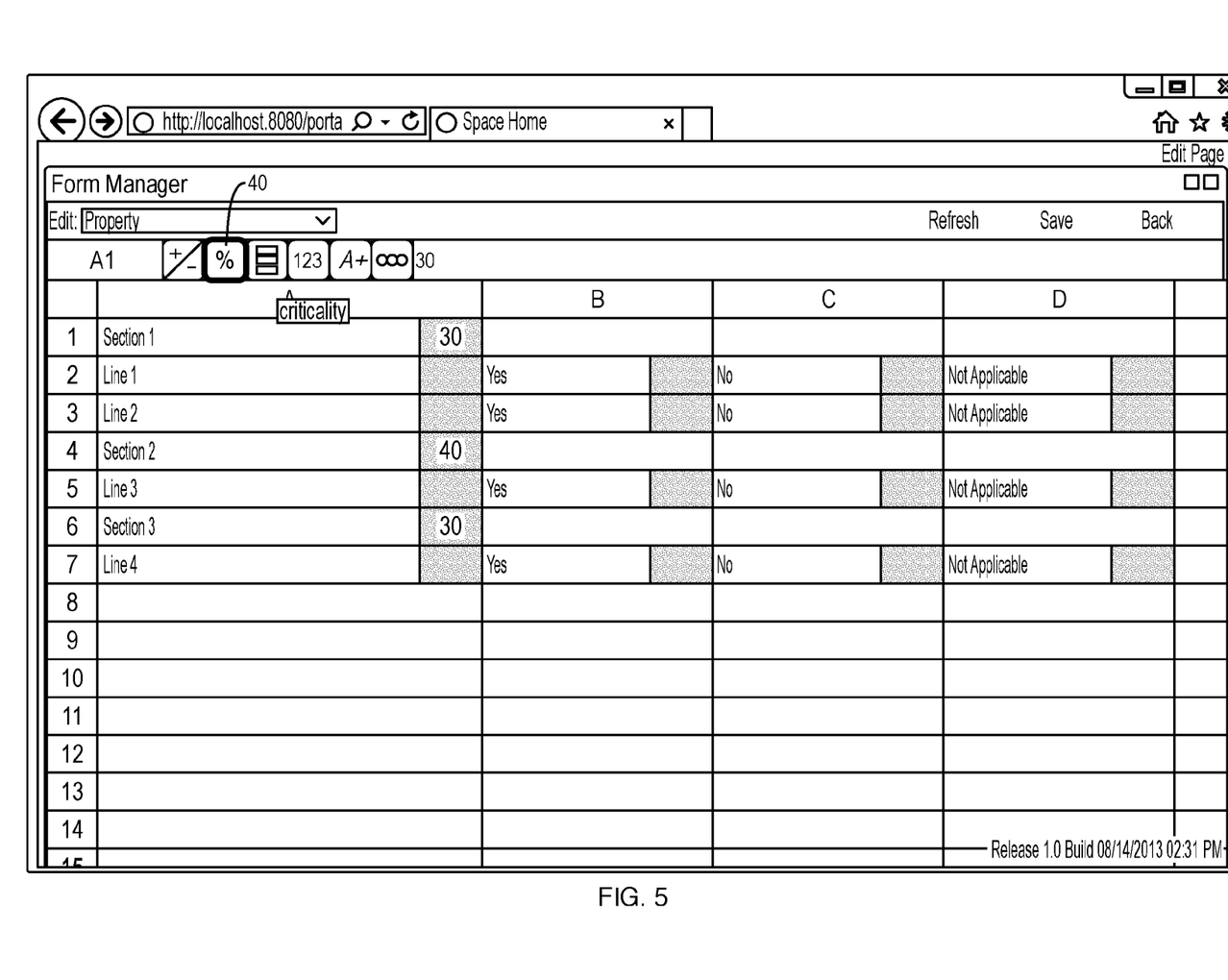

For example, it may be desired to assign different "weight" to each section as follows:
  Section 1: 30%
  Section 2: 40%
  Section 3: 30%

As shown in FIG. 5, the above "Weight" values are assigned to corresponding cells to achieve this goal. The weight values appear in highlighted sections of the cells when the weight button 40 is selected.

A dimension of data may be sparse, i.e., applicable to only a subset of cells. For example, the "Weight" property may only apply to certain cells, and for the rest of the cells, "Weight" is not defined.

Figure 6:
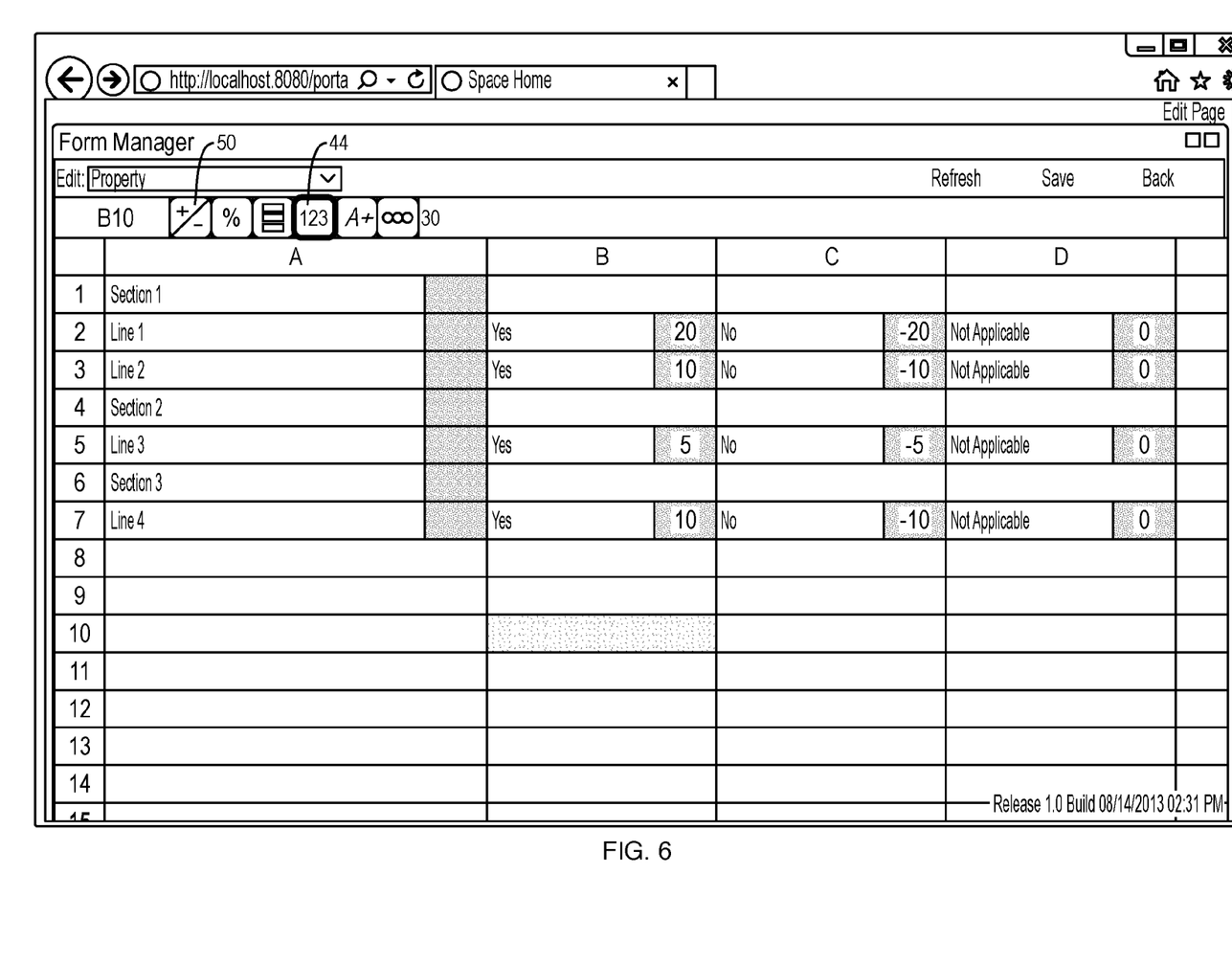

FIG. 6 shows an additional dimension of data named "Value", used to translate non-numerical selections into numerical values that are usable for score calculations. In this example, values are assigned as follows:
  Line 1: Yes (20) No (−20) Not Applicable (0)
  Line 2: Yes (10) No (−10) Not Applicable (0)
  Line 3: Yes (5) No (−5) Not Applicable (0)
  Line 4: Yes (10) No (−10) Not Applicable (0)
  For other cells, "Value" is not defined.

The following describes how properties may be added to a form object:

1. When the form is translated from the designer view, the individual questions and potential answers (selections) are placed on a grid. Each heading is on a separate row. Each question along with its answers/selections is on one row.

2. The designer selects a cell, and in the property toolbar can toggle through all of the properties of the cell. Prior to any values being assigned, none of the properties will be filled out yet.

3. To add "value" to a question, a cell with an answer option is selected, and the property toolbar button "value" is selected. The value displayed should be empty. Next, the designer can click in the grid area and type in a desired value (e.g., number of points) for that answer option.

Below is a list of properties that may be provided by default in one embodiment:

Text: This is the text of the question or answer option, reproduced exactly from what was written in the designer. This cannot be edited. This is saved on the back-end and not displayed to the user.

Type: This is the type of the question, which comes from what the user selected in the designer. This cannot be edited. This is saved on the back-end and not displayed to the user.

Weight: This is used to put percentage weights on questions or sections. The weights may be entered in decimal form. The collection of weights across a set of sections should add up to 1.00, or 100% in total.

Value: This is used to assign the points received for choosing that answer choice. This can also be used to create a weighted scoring system. The values can be any number, and can add up to any total.

Color: To assign a question, section, or answer option a color. The set of colors to choose from may be set up by an administrator.

Grade: To assign an answer option a grade. For example, if a multiple choice question has answer choices 1, 2, 3, 4, and 5, grades such as the following can be assigned "A" for 1, "B" for 2, "C" for 3, "D" for 4, and "F" for 5.

Criticality: This can designate the priority of a question or section. For example, question 1 may be more important to answer correctly than question 2. Question 1 may be designated "Critical," and question 2 may be designated "Medium." The set of criticality options to choose from may be set up by an administrator.

Other: A user can set up other properties for their forms for grading purposes. Examples include a string property called "Section", and all of the questions belonging to that section carry the section name as a property.

A user can add or delete properties on a form. A form may have a set of default properties or no properties to start out with. Generally, properties may be form-wide, i.e., when a property is added, it is available to all cells on the form.

To add properties, the user clicks the "Plus-Minus" button 50 (FIG. 6) on the property toolbar. This brings a window (e.g., pop-up) in which the user can add properties from a property library to be included as a form property or take away form properties and put them back in the property library. A user can also change the order of the properties in the list by clicking on up and down arrows next to the property name, and this will change the order as the properties appear on the property toolbar. The properties on the property library will be listed in alphabetical order. When a user removes a property, the property and all of the inputted values for that property are removed and deleted.

Property Views

The views allow the designer to see one particular property for all cells in the grid area. The views appear automatically when a particular property is selected in the property toolbar.

The view changes the grid area to display the property's value in an area (e.g., top right hand corner) of every cell. The text in the cell may be grayed out to aid in viewing the property's text or value. In general, there is a view for every property.

Weight View
  Value View
  Color View
  Grade View
  Criticality View

The program may be designed to only allow editing a property when that particular property's view is active.

Formula View

The formula view is where designers create formulas to achieve desired functionality of the form, such as scoring a user submission. Logic and calculation can be defined via formulas and performed on the form. There may be one or multiple formulas, and they may act on a subsection of the form or the entire form.

As described above, a Form contains both form elements and collected data. A formula is a form element that can be defined to reference the following data as input:
  Properties on the form element
  Collected data
  Output of another formula In another words, a Formula can reference not only "Properties" of the form, but also data collected or output of another Formula which is calculated at a later time.

Examples of Formula

Figure 7:
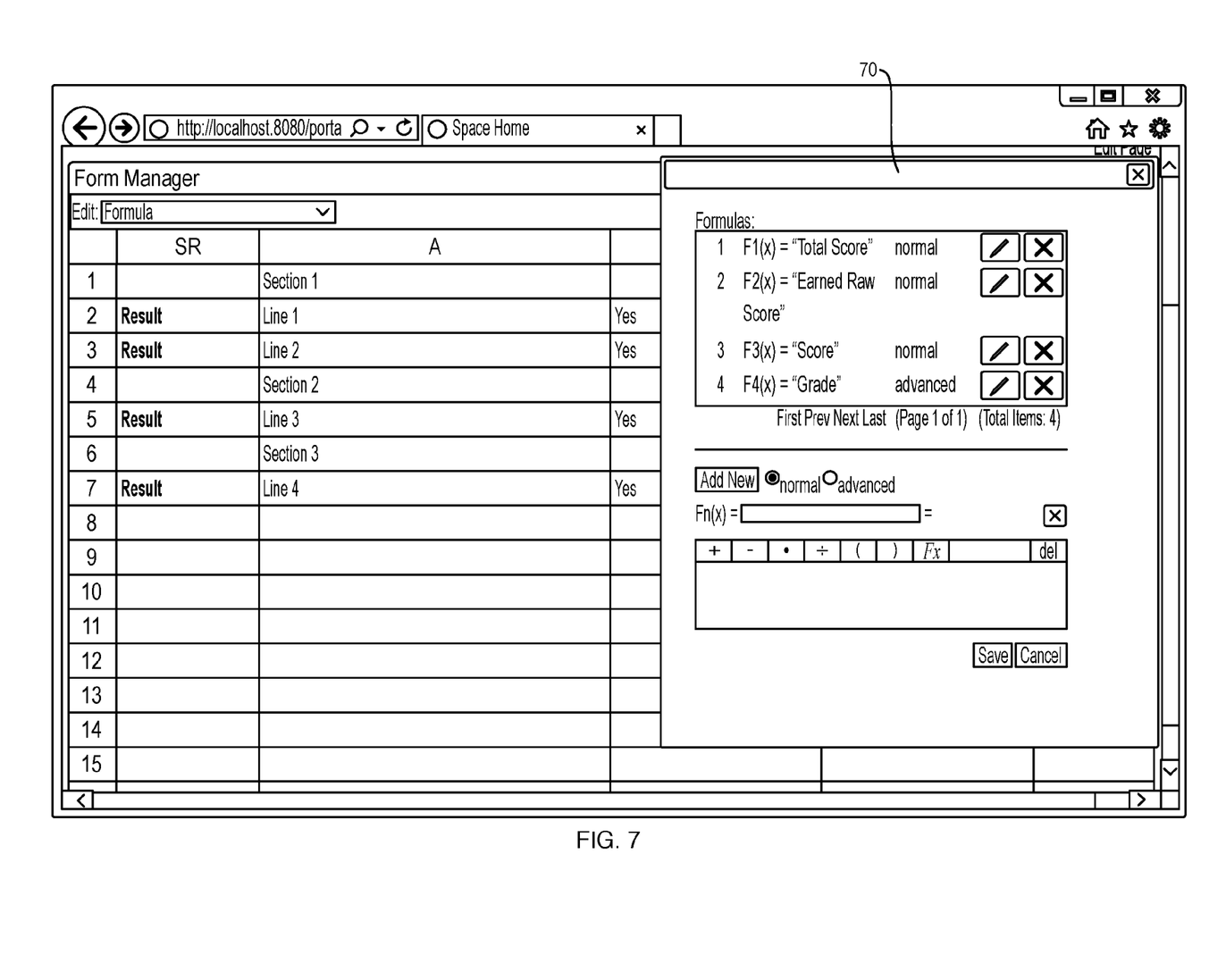

FIG. 7 shows an example formula view, which is essentially the grid view with a formula sub-window 70 partially overlaid on the grid. For this sample form, the logic to calculate a "Total Score" is to add the maximum "Value" for all four (4) lines, and apply the "Weight" for each section. In other words, the "Total Score" is calculated as follows:

$$F1(x)=(B2+B3)*A1[\text{weight}]+(B5)*A4[\text{weight}]+(B7)*A6[\text{weight}]$$

Also, an "Earned Raw Score" is defined:

$$F2(x)=(SR2+SR3)*A1[\text{weight}]+(SR5)*A4[\text{weight}]+(SR7)*A6[\text{weight}]$$

And a normalized "Score" is defined:

$$F3(x)=F2(x)/F1(x)*100$$

It should be noted that formulas may include logical operations as well, as shown below:

$$F4(x)=\text{if } (F3>95)\{\text{'}A\text{'}\} \text{ else if } (F3<=95\&\&F3>=80) \{\text{'}B\text{'}\} \text{ else if } (F3<80\&\&F3>=65)\{\text{'}C\text{'}\} \text{ else } \{\text{'}F\text{'}\}$$

The grid area is different in the "Formula View" from the "Property View." For the formula view, a new "Submissions Results" (SR) column appears which represents the user submissions. All control types have a "Result" cell except the "Heading" control. If a question has multiple answer options to choose from but only one answer is allowed, the actual answer is represented as one cell. This assumes that when a user actually fills out the form, the user chooses one of the options. Alternatively, if a user can choose more than one option, the form object may by default either add the values or keep them in a list. The one result cell represents what the user has chosen upon filling out the form. The result cell is a shortcut way to quickly tabulate a final score for a form.

The result cell is found in different ways from the different controls:

Radio Button: (represents one choice selection given a bunch of options) the result cell is the score received for that answer response. The form captures the coordinate of the user choice and then looks up the corresponding value.

Check Box: (represents one or more user choices based on a bunch of options) the result cell will be the score added up from each response. The form captures the coordinate(s) of the user choice, looks up the corresponding values, and then adds up the none, one or multiple values.

For generating submission results, the form controls can be divided into three types:

Category 1
Text Box—[Control Label] [User Input]
Text Area
File Upload

Taking "Text Box" for example, and defining A1=[Control Label], and B1=[User Input];
If user fills in B1, SR1 [value]=B1 [value], SR1 [weight]=B1 [weight];
Else SR1 [value]=0, SR1 [weight]=0.

Category 2
Drop Down—[Control Label] [Option1] [Option2] [Option3]
Radio Button
Check Box
Star Rating
Scale Rating Taking "Drop Down" for example, and defining A2=[Control Label], B2=[Option1], C2=[Option2], D2=[Option3];
If user selects one option (ex: Option2), SR2 [value]=C2 [value], SR2 [weight]=C2 [weight];
Else SR2 [value]=0, SR2 [weight]=0.

Category 3
Number—[Control Label] [User Input]
Sliding
Spinner

Compared to Category 1, the controls in Category 3 have one more available property (Literal) for calculating. "Literal" represents the number a user inputs.

Taking "Number" for example, and defining A3=[Control Label], B3=[User Input];
If user inputs a number in B3, SR3 [literal]=B3 [literal];
Else SR3=0.

Events

Beyond properties and formulas, in some embodiments a form object may also be designed to include Form Events, which refers to a "Condition" based on Form data and properties, and an "Action" that will happen if the condition(s) are met. The condition(s) can be defined based on form element properties, collected data or formula results. Action(s) can be defined to kick of a task or workflow.

Figure 8:
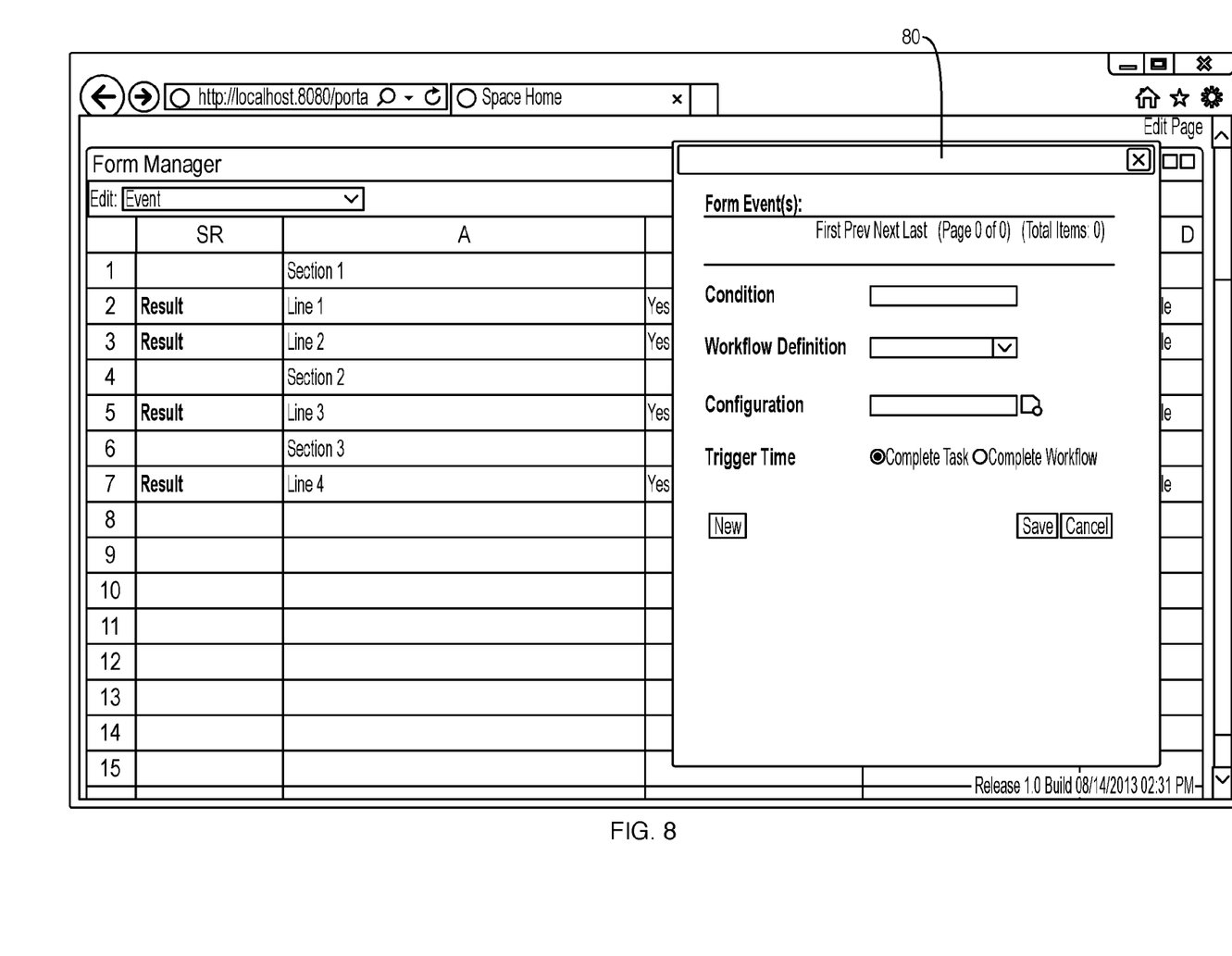

FIG. 8 shows an example of an event view, which is similar to the formula view except that the overlaid window 80 is an event definition window rather than a formula definition window.

Figure 9:
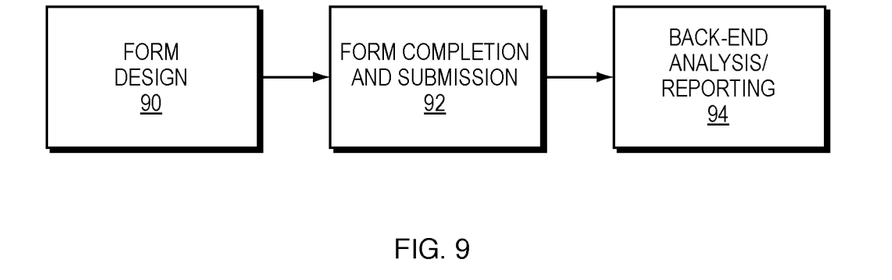
FIG. 9 is a flow diagram of one type of application of the form object design and use process.

FIG. 9 shows a flow of one type of application of the disclosed techniques, namely one in which multiple instances of a form object are completed for separate subjects of collection/analysis (e.g., different vendors as mentioned above) and then submitted for use by a higher-level analysis and/or reporting process. As shown, the process includes form design 90, form completion and submission 92, and back-end analysis and/or reporting 94. As mentioned, the design process 90 may include operations of a form designer who is a separate individual from the form users who attend to form completion and submission at 92.

Figure 10:
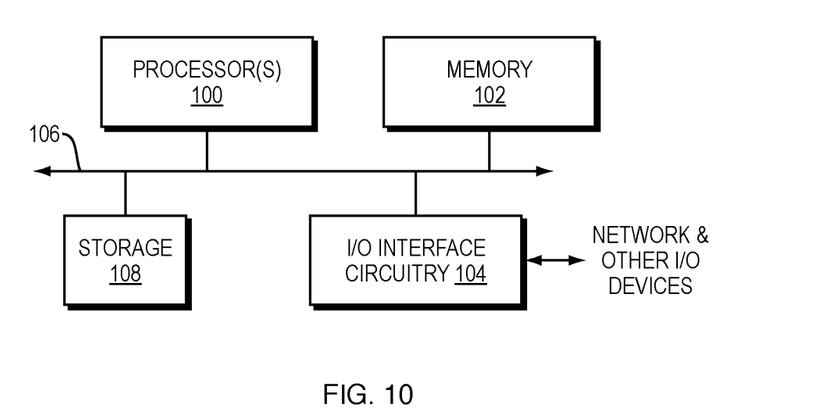
FIG. 10 is a block diagram of a computer from a hardware perspective.

As mentioned, the processes herein may be realized in part by software, more particularly by software executing on one or more physical computers. FIG. 10 shows an example configuration of a physical computer from a computer hardware perspective. The hardware includes one or more processors 100, memory 102, and interface circuitry 104 interconnected by data interconnections 106 such as one or more high-speed data buses. The interface circuitry 104 provides a hardware connection to separate network interconnect (not shown) and perhaps other external devices/connections (EXT DEVs). The processor(s) 100 with connected memory 102 may also be referred to as "processing circuitry" herein. As mentioned, there may also be local storage 108 such as a local-attached disk drive or Flash drive. In operation, the memory 102 stores data and instructions of system software (e.g., operating system) and one or more application programs which are executed by the processor(s) 100 to cause the hardware to function in a software-defined manner. Thus the computer hardware executing instructions of a form designer application, such as described herein, can be referred to as a form designer circuit or component, and it will be understood that a collection of such circuits or components can all be realized and interact with each other as one or more sets of computer processing hardware executing different computer programs as generally known in the art.

While various embodiments of the invention have been particularly shown and described, it will be understood by those skilled in the art that various changes in form and details may be made therein without departing from the spirit and scope of the invention as defined by the appended claims.

What is claimed is:

1. A method of data collection and analysis, comprising:
   (i) in a form design process, performing, by a computer processor, the following for each of a plurality of form objects:
      in a first design operation, responding to input from a form designer to create a form representation of a form and saving the form representation as part of the form object, the form representation being displayable to a form user and including an arrangement of form elements selected by the designer and having respective sets of possible data selections from which the form user will select to create corresponding actual data selections;
      automatically creating a grid representation of the form based on the form representation and saving the grid representation as part of the form object, the grid representation including an array of cells corresponding to the form elements and sets of selections, the array of cells being organized in a first dimension according to the arrangement of the form elements and being organized in a second dimension according to the possible data selections in the sets of possible data selections; and
      in a second design operation, responding to input from the form designer to (i) identify properties and assign respective property values to selected cells of the array, the property values being user-visible in association with the respective cells in a properties view of the grid representation, and (ii) create functions for performing calculations using the actual data selections and corresponding property values to yield derived values, the property values and functions being saved in the form object so as to automatically generate the derived values at a later time when the actual selections are provided by the form user;
   (ii) in a subsequent form submission process, receiving form submissions each including an instance of the form object containing corresponding derived values and actual data as input by a corresponding form user; and
   (iii) subsequently performing back-end analysis or reporting based on the actual data and derived values in the form submissions,
   wherein creating functions includes presenting a formula view to the form designer, the formula view including a modified version of the grid representation including a result column for holding a result of evaluating a function, the formula view also including a formula pane overlaid on the array of cells and usable by the form designer to create the functions.

2. The method according to claim 1, wherein the properties include a weight property and wherein assigning respective property values includes assigning respective weights to the selected cells, and wherein creating the functions includes creating a weighted summation function operative to calculate a weighted summation as a derived value, the weighted summation (i) calculating summands as products of cell values and the respective weights of the cells, and (ii) adding the summands together.

3. The method according to claim 1, further including, in a second design operation, responding to input from the form designer to (iii) create triggerable events and save the events in the form object so as to automatically cause actions to occur at a later time in response to a triggering condition during use of the form object.

4. The method according to claim 3, wherein the events include at least one of (i) tasks performed by a computer or software programs, and (ii) tasks assigned to human users.

5. The method according to claim 1, wherein:
   the form object is for use in a process of evaluating an organization's compliance with a predefined standard;
   the data selections include sets of possible answers to questions about aspects of the organization as pertaining to the predefined standard;
   the property values include (i) numerical values assigned to corresponding non-numerical data selections, and (ii) weights reflecting relative emphasis placed on the respective questions in evaluating the organization's compliance; and
   the functions include a weighted summation that (a) applies the weights to numerical data selections and the numerical values of the non-numerical data selections, and (b) adds weighted values together to generate a compliance score for the organization as the derived value.

6. The method according to claim 1, further including, in the first design operation, presenting a form design graphical user interface to the form designer, the graphical user interface including a form design screen including a form element selection pane and a form view pane, the form element selection pane including predefined form elements capable of being dragged and dropped onto the form view pane to design the form representation, the form view pane presenting the form representation as it is created during the first design operation.

7. The method according to claim 1, further including, during the second design operation upon transitioning to the properties view, displaying a property name and displaying assigned property values for the property name in the cells to which the property values are assigned.

8. The method according to claim 7, wherein displaying the assigned property values includes displaying the assigned property values in a predefined area of each cell separate from an area of the cell in which the possible data selection contained by the cell is displayed.

9. The method according to claim 1, wherein the formula pane has a size less than one-half a size of the array of cells so as to only partially occlude the array of cells.

10. The method according to claim 1, wherein:
    the first design operation uses a first graphical user interface screen for displaying the form representation to the form user and receiving data selections from the form user; and
    the second design operation uses a second graphical user interface screen for displaying the grid representation to the form user and receiving the input from the form designer that (i) identifies the properties and assigns the respective property values, and (ii) creates the functions for performing the calculations.

11. The method according to claim 1, wherein the form object resulting from the method is a file having an interchange format (i) enabling transfer of the form object among computer systems and (ii) separating creation of the form object by the form designer from use of the form object by form users to capture and analyze data.

12. The A method according to claim 1, wherein the grid representation is a displayable representation displayed to the form designer in the second design operation.

13. A non-transitory computer-readable medium storing computer program instructions, the instructions being executable by a set of one or more computers to cause the computers to perform a method of data collection and analysis, the method including:
(i) in a form design process, performing the following for each of a plurality of form objects:
in a first design operation, responding to input from a form designer to create a form representation of a form and saving the form representation as part of the form object, the form representation being displayable to a form user and including an arrangement of form elements selected by the designer and having respective sets of possible data selections from which the form user will select to create corresponding actual data selections;
automatically creating a grid representation of the form based on the form representation and saving the grid representation as part of the form object, the grid representation including an array of cells corresponding to the form elements and sets of selections, the array of cells being organized in a first dimension according to the arrangement of the form elements and being organized in a second dimension according to the possible data selections in the sets of possible data selections; and
in a second design operation, responding to input from the form designer to (i) identify properties and assign respective property values to selected cells of the array, the property values being user-visible in association with the respective cells in a properties view of the grid representation, and (ii) create functions for performing calculations using the actual data selections and corresponding property values to yield derived values, the property values and functions being saved in the form object so as to automatically generate the derived values at a later time when the actual selections are provided by the form user;
(ii) in a subsequent form submission process, receiving form submissions each including an instance of the form object containing corresponding derived values and actual data as input by a corresponding form user; and
(iii) subsequently performing back-end analysis or reporting based on the actual data and derived values in the form submissions,
wherein creating functions includes presenting a formula view to the form designer, the formula view including a modified version of the grid representation including a result column for holding a result of evaluating a function, the formula view also including a formula pane overlaid on the array of cells and usable by the form designer to create the functions.

14. The non-transitory computer-readable medium according to claim 13, wherein the properties include a weight property and wherein assigning respective property values includes assigning respective weights to the selected cells, and wherein creating the functions includes creating a weighted summation function operative to calculate a weighted summation as a derived value, the weighted summation (i) calculating summands as products of cell values and the respective weights of the cells, and (ii) adding the summands together.

15. The non-transitory computer-readable medium according to claim 13, wherein the method further includes, in a second design operation, responding to input from the form designer to (iii) create triggerable events and save the events in the form object so as to automatically cause actions to occur at a later time in response to a triggering condition during use of the form object.

16. The non-transitory computer-readable medium according to claim 15, wherein the events include at least one of (i) tasks performed by a computer or software programs, and (ii) tasks assigned to human users.

17. The non-transitory computer-readable medium according to claim 13, wherein:
the form object is for use in a process of evaluating an organization's compliance with a predefined standard;
the data selections include sets of possible answers to questions about aspects of the organization as pertaining to the predefined standard;
the property values include (i) numerical values assigned to corresponding non-numerical data selections, and (ii) weights reflecting relative emphasis placed on the respective questions in evaluating the organization's compliance; and
the functions include a weighted summation that (a) applies the weights to numerical data selections and the numerical values of the non-numerical data selections, and (b) adds weighted values together to generate a compliance score for the organization as the derived value.

18. The non-transitory computer-readable medium according to claim 13, wherein the method further includes, in the first design operation, presenting a form design graphical user interface to the form designer, the graphical user interface including a form design screen including a form element selection pane and a form view pane, the form element selection pane including predefined form elements capable of being dragged and dropped onto the form view pane to design the form representation, the form view pane presenting the form representation as it is created during the first design operation.

19. The non-transitory computer-readable medium according to claim 13, wherein the method further includes, during the second design operation upon transitioning to the properties view, displaying a property name and displaying assigned property values for the property name in the cells to which the property values are assigned.

20. The non-transitory computer-readable medium according to claim 19, wherein displaying the assigned property values includes displaying the assigned property values in a predefined area of each cell separate from an area of the cell in which the possible data selection contained by the cell is displayed.

* * * * *